BEST AVAILABLE COPY

United States Patent [19]

Itagaki

[11] 3,895,230

[45] July 15, 1975

[54] PHOTOMETRIC CIRCUIT WITH PHOTO-VOLTAIC ELEMENT

[75] Inventor: Takuo Itagaki, Wako, Japan

[73] Assignee: Asahi Kogaku Kogyo Kabushiki Kaisha, Tokyo, Japan

[22] Filed: Apr. 4, 1973

[21] Appl. No.: 347,796

[30] Foreign Application Priority Data

Apr. 10, 1972 Japan .............................. 47-42332

[52] U.S. Cl. .............................. 250/214 P; 354/24

[51] Int. Cl. .............................. H01j 39/12

[58] Field of Search ........ 250/206, 208, 209, 214 R, 250/214 P; 307/311; 95/10 C, 10 CD, 10 CT; 354/24

[56] References Cited

UNITED STATES PATENTS

| | | | |
|---|---|---|---|
| 3,311,748 | 3/1967 | Volpe | 250/210 |
| 3,504,603 | 4/1970 | Brzonkala | 250/208 |
| 3,514,209 | 5/1970 | McGhee | 250/207 |
| 3,525,942 | 8/1970 | Boronkay | 250/206 |
| 3,600,589 | 8/1971 | Hanson | 250/214 |
| 3,604,941 | 9/1971 | Crum | 250/214 |
| 3,652,791 | 3/1972 | Shuey | 250/214 |
| 3,660,670 | 5/1972 | Howard | 250/206 |
| 3,670,637 | 6/1972 | Mori | 250/206 |
| 3,703,130 | 11/1972 | Watanabe | 250/206 |

*Primary Examiner*—James W. Lawrence
*Assistant Examiner*—D. C. Nelms
*Attorney, Agent, or Firm*—Christie, Parker & Hale

[57] ABSTRACT

A photometric circuit. An operational amplifier has inversion input, non-inversion input and output terminals. A feedback circuit is coupled between the output and the inversion input terminals. A photo diode provides a photo-voltaic effect between the inversion input and non-inversion input terminals. The feedback circuit is characterized in that the signal across the photo-electric diode is maintained at substantially 0 volts. A diode is coupled to the current from the photo-electric diode for providing an output signal proportional to the logarithm of the current.

20 Claims, 5 Drawing Figures

PHOTOMETRIC CIRCUIT WITH PHOTO-VOLTAIC ELEMENT

BACKGROUND OF THE INVENTION

The present invention relates to a circuit to improve the distortion in linearity (in the current output and the intensity of illumination on the light-receiving surface) caused by the bias voltage of a photo-electric element (for example, a photo-diode) which has a photo-voltaic effect, and to facilitate the coupling of the photo-voltaic element to a logarithmic compression element (for example, a diode).

Generally, when a photo-diode is used as a light-receiving device for cameras, the photo-diode is energized with an inverse bias voltage to obtain an output current proportional to the illumination on the light-receiving surface (hereinafter called illumination) of the photo-diode.

However, this method has a disadvantage. Current is present in the diode during illumination due to the inverse saturation current of the photo-diode and due to the leakage current of the body material of the photo-diode (both currents being called dark current hereinafter). The disadvantage comes about in that the output current of the photo-diode is not proportional to the illumination, if the electric current caused only by the input light to the photo-diode (hereinafter called a photoelectric current) becomes so small the dark current is not negligible. (See FIG. 4)

Also, if the photo-diode is not biased properly, the drop in voltage caused on load by a photoelectric current biases the photo-diode in the forward direction so that the photoelectric current runs in the forward direction in the PN junction of the photo-diode and the output current at the terminal of the photo-diode is not proportional to the illumination in the range of higher illuminations (See FIG. 5). Therefore, it is difficult to obtain an output current from the biased photo-diode proportional to the illumination, at the higher ranges of illumination which the light-receiving surface of a camera receives.

SUMMARY OF THE INVENTION

According to an embodiment of the present invention, there is produced an output current proportional to the illumination over an extremely large range of illumination. Also, facilitated is the coupling of a photo-diode to a logarithmic compression element, by keeping the interterminal voltage across the photo-diode at zero by means of a negative feedback circuit. As a result, the above-described disadvantage caused by conventional methods is eliminated.

Therefore, according to an embodiment of the present invention, the output current of the photo-diode is proportional to the illumination over a large range of illumination of 1 to 100,000, necessary for a light-receiving device of a camera. Therefore, it is possible to improve the conventional photometric systems as well as to facilitate the coupling of the photo-diode to a logarithmic compression element and to allow such operation over a very large range as in application to automatic exposure controlling circuits of cameras.

The present device will be better understood by the following description in reference to the annexed drawings.

Briefly, an embodiment of the present invention is in a photometric circuit. A photo-voltaic means is provided having first and second terminals between which current is passed proportional to received light. Means is provided for sensing the electrical signal across the first and second terminals and means is provided with an output circuit coupled to one of the terminals for maintaining a substantially zero interterminal voltage across the terminals. Logarithmic compression means is serially coupled between the other one of the terminals of the photo-voltaic means and a reference potential and is responsive to the current provided by the photo-voltaic means for providing an output signal.

According to a preferred embodiment of the invention the photometric circuit has an operational amplifier having inversion and non-inversion signal input terminals and an output terminal. Means providing a photo-voltaic effect is coupled between the inversion input and non-inversion input terminals. A feedback circuit is coupled between the output terminal and the inversion input terminal causing the voltage of the signal across the photo-voltaic means to be maintained at substantially zero. Means is serially coupled between the non-inversion input terminal and a reference potential and is characterized in that a signal is formed thereacross corresponding to the logarithm of current received from the photo-voltaic means.

Preferably the photometric circuit is embodied in a camera having a trailing screen and means is provided that is responsive to the output signal for selectively actuating the trailing screen.

BRIEF DESCRIPTION OF THE DRAWINGS

FIGS. 4 and 5 plot illumination intensity on the light receiving surface L of the photo-diode against output electric current $I_d$.

DESCRIPTION OF THE PREFERRED EMBODIMENT

Figure 1:
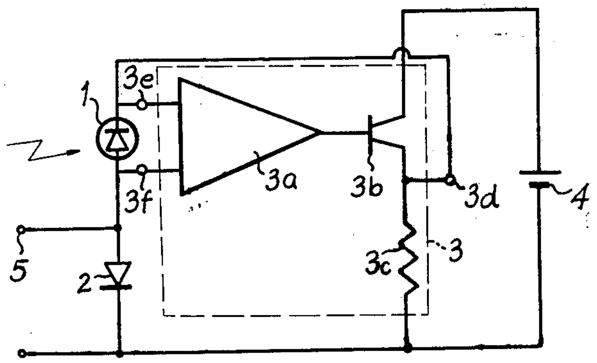
FIG. 1 is a schematic diagram of a light measuring circuit and embodies the present invention.

Referring to FIG. 1, the relation between the interterminal voltage $V_d$ of a photo-voltaic element such as photo-diode 1 and the current $I_d$ in the photo-diode 1 can be represented by the following formula:

$$I_d = I_o(\exp qV_d/ k_T - 1) - I_L \quad (1)$$

wherein $I_o$ is an inverse saturation current, $I_L$ is a photoelectric current, $q$ represents electrons through photo-diode 1 and $k$ is the Boltzmann Constant.

If the current $I_d$ running in the photo-diode 1 is only the photoelectric current $I_L$, the interterminal voltage $V_d$ is zero, that is, $V_d = 0$.

Operational amplifier 3 connected between the terminals of the photo-diode 1 contains a differential amplifier 3*a*, a transistor 3*b* and a resistance 3*c*, and the input impedance thereof and gain are quite high.

The output terminal 3*d* of the operational amplifier 3 is connected in a feedback circuit to an inversion input terminal 3*e* so that the voltage at a non-inversion input terminal 3*f* connected to a negative power source line, is equal to the voltage on the inversion input terminal 3$e$ making the potential difference between the two terminals zero.

Thus, with this feedback circuit arrangement and the photo-diode 1 between the inversion input terminal 3$e$ and the non-inversion input terminal 3$f$ of operational amplifier 3, the interterminal voltage of the photo-diode 1 is maintained zero at independently from the values of photoelectric current. Therefore, the interterminal voltage $V_d$ in the formula (1) is always kept zero, the current $I_d$ in the photo-diode 1 is $I_d = -I_L$, so that current proportional to the illumination will flow from the photo-diode 1 to photo-diode 2. Consequently, a voltage proportional to the logarithm of the photoelectric current $I_L$ (or the logarithm of the illumination) is produced at terminal 5 by the action of the photo-diode 2. The diode 2 is a conventional germanium diode or a silicon diode.

Figure 2:
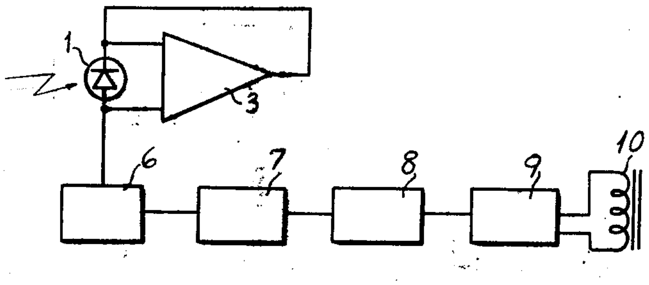
FIG. 2 is a block diagram of a light measuring circuit in a camera with automatic exposure controls and embodies the present invention.

FIG. 2 is a block diagram showing an example of an embodiment in which a photometric circuit according to the present invention is applied in an automatic exposure control camera.

A logarithmic compression element 6 such as a diode produces a logarithmic compression of the output current of the photo-diode 1 so as to produce an output voltage proportional to the logarithm of the illumination between two terminals. If a logarithmic compression is obtained to produce a logarithm of 2, the output voltage is proportional to the APEX index in the APEX system, that is, the exposure parameter additional calculation system.

If the proportional relation between the illumination on the light-receiving surface and the photo-electric current $I_L$ and the proportional relation between the illumination on the light-receiving surface and the brightness in the field of an object to be photographed are taken into consideration, the output voltage of the logarithmic compression element 6 is proportional to log 2B.

The photographic relation according to the APEX system is represented as follows:

$$T_V = B_V \;\; S_V - A_V$$

wherein $B$ is the brightness in the field of an object to be photographed, $A$ represents diaphragm aperture, $S$ is film $VT$ is exposure time and $B_V$, $A_V$, $S_V$ and $T_V$ are their APEX indexes, respectively.

If the output voltage (proportional to $B_V$) of the logarithmic compression element 6 is $V_B$, the output voltage of a diaphragm conversion resistor connected to a diaphragm ring and the output voltage of an ASA conversion resistor connected to an ASA ring are $V_A$ and $V_S$ proportional to the APEX indexes $A_V$ and $S_V$, respectively, and the proportional constant is the same in the two cases, it can be clearly understood that the voltage $V_T$ corresponding to the APEX index $T_V$ of the exposure time $T$ can be represented by the following formula:

$$V_T = V_B + V_S - V_A$$

Operational circuit 7 in FIG. 2 is to make a calculation according to the above-mentioned formula and has inputs $V_B$, $V_S$ and $V_A$, and an output $V_T$.

A logarithmic expansion timing circuit 8 obtains a logarithmic expansion of the output voltage $V_T$ of the operational circuit 7 corresponding the APEX index $T_V$ of exposure time and produces a current proportional to the exposure time $T$. This current charges a condensor at the same time as the starting of the leading screen operation to produce an exposure time T and denergizes magnet 10 to an OFF condition through a switching circuit 9, thereby starting the operation of a trailing screen.

The disposition of a logarithmic compression element 6, an operational circuit 7, a logarithmic expansion timing circuit 8, a switching circuit 9 and a magnet 10 in an automatic exposure control camera is known.

Figure 3:
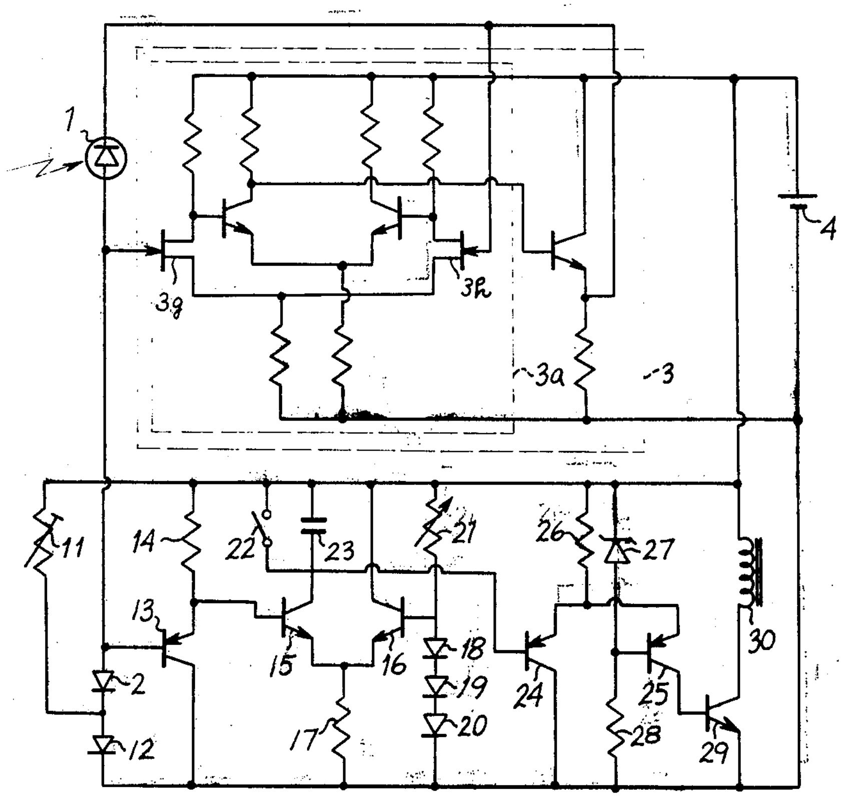
FIG. 3 shows a preferred embodiment of the circuit of FIG. 2 and embodies the present invention.
Figure 4:
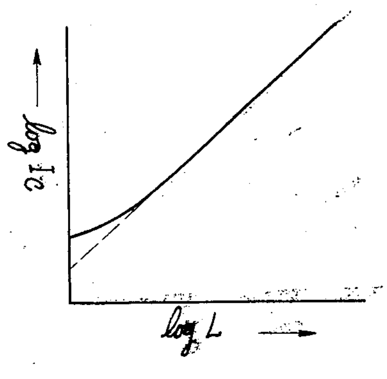
FIGS. 4 and 5 are graphs illustrating the photoelectric converting property of a photo-diode.
Figure 5:
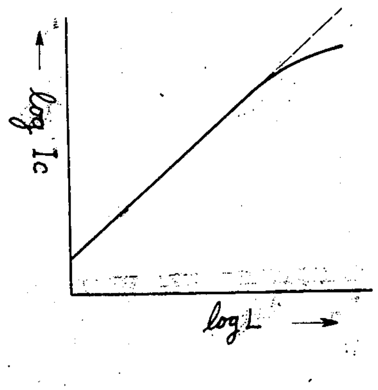

Referring now to the specific example of the circuit shown in FIG. 3, Field Effect Transistors 3$g$ and 3$h$ in a differential amplifier circuit 3$a$ are used to raise the input impedance of the operational amplifier 3.

As it was described hereinbefore, the interterminal voltage of the photo-diode 1 is kept constantly at zero and the photoelectric current $I_L$, which is proportional to the illumination, is applied to the logarithmic compression diode 2, where the photoelectric current $I_L$ is logarithmically decreased so as to produce a voltage $V_B$, proportional to the APEX index $B_V$ of the brightness in the field, between the two terminals of the diode 2. A diode 12 and a variable resistance 11 control voltage levels to obtain an exposure time $T$ corresponding to the value $T_V$ as a result of a photographical calculation. The following relation is required not to change the interterminal voltage $V_P$ of the diode 12 according to the variation of the photoelectric current $I_L$;

$$I_L < I_P$$

wherein $I_P$ is a current running in the resistance 11. As the interterminal voltage $V_P$ of the diode 12 is predetermined at a fixed value by means of the variable resistance 11 so as to satisfy the condition to obtain the above-mentioned exposure time $T$, the interterminal voltage $V_P$ has no relation to the APEX index of the brightness in the field. Therefore, only the interterminal voltage $V_B$ of the diode 2 is considered in the photographic calculation. The total voltage $V_B + V_P$ of the voltages $V_B$ and $V_P$ is applied to the non-inversion input terminal of a differential amplifier formed by transistors 15 and 16 and a resistance 17, through an amplifier formed by a transistor 13 and a resistance 14.

On the other hand, a variable resistance 21 as well as diodes 18, 19 and 20 have characteristics forming a voltage ($V_A - V_S$) at the inversion input terminal of the differential amplifier formed by transistors 15 and 16 and a resistor 17. Therefore, condensor 23 is charged with a constant current inversely proportional to the exposure time $T$. A switch 22 is opened in synchronization with the starting of the former diaphragm operation, and the condensor 23 begins to be charged at the same time as the starting of exposure. The voltage of the condensor 23 rises linearly at a rate determined by the current value inversely proportional to the exposure time $T$ and by the capacity of the condensor 23 to a predetermined value at which the switching circuit formed by transistors 24, 25 and 29, resistors 26 and 28 and a constant voltage diode 27 stop the excitation of a magnet 30 to start an operation of the trailing screen and thus an automatic exposure.

With such an automatic exposure control circuit, a photoelectric conductive element CdS adaptable to an extremely large range of field brightness has been conventionally used as a light-receiving element. However, this element has a defect in that its optical response is slow. On the contrary, a photo-voltaic element such as a photo-diode is extremely rapid in optical response and has desirable characteristics as light-receiving element, but it has been extremely difficult for this element in the conventional methods to cover the whole desired range of field brightness (0.01 Lux to 10,000 Lux in single lens reflex cameras) owing to the linear distortion (output current; illumination on the light-receiving surface) caused by a bias voltage applied to the photo-diode.

The present invention is superior in that the above-mentioned defect of the photo-diode is eliminated and the good characteristics of a photo-diode such as rapid optical response, little optical hysteresis phenomenon, excellent aging stability, etc., which the photoelectric conductive is short of, are displayed, so as to be practically applied for light-receiving element of an automatic exposure control camera.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

What is claimed is:

1. A photometric circuit comprising:

an operational amplifier having inversion and non-inversion signal input terminals and an output terminal;

means providing a photo-voltaic effect coupled between the inversion input and non-inversion input terminals;

a feedback circuit coupled between the output terminal and the inversion input terminal causing the voltage of the signal across the photo-voltaic means to be maintained at substantially 0; and means serially coupled between an end of the photo-voltaic means which is coupled to the non-inversion input terminal and a reference potential and characterized in that a signal is formed thereacross corresponding to the logarithm of current received from the photo-voltaic means.

2. The photometric circuit of claim 1 wherein said means for providing an output signal proportional to the logarithm compression of current comprises a diode.

3. A photometric circuit according to claim 1 wherein said photo-voltaic means comprises a photo diode.

4. A photometric circuit comprising:

an operational amplifier having inversion and non-inversion signal input circuits and an output circuit;

photo-voltaic means having first and second terminals coupled, respectively, between the inversion and non-inversion signal input circuits;

means for maintaining the interterminal voltage of said photo-voltaic means at substantially 0 volts comprising a feedback circuit coupled between the output circuit of said operational amplifier and the first terminal of said photo-voltaic means; and logarithmic compression means serially coupled between an end of the photo-voltaic means which is coupled to the non-inversion input terminal and a reference potential and responsive to the current provided by said photo-voltaic means for providing an output signal.

5. The photometric circuit of claim 4 wherein said logarithmic compression means comprises a semi-conductor diode coupled between the photo-voltaic means and the reference potential.

6. The photometric circuit of claim 4 wherein said photo-voltaic means comprises a semi-conductor photodiode.

7. The photometric circuit of claim 5 wherein said photo-voltaic means comprises a semi-conductor photodiode, said semi-conductor photodiode and diode being serially connected together and polled to provide opposite PN junctions in the diodes serially passing through the serially connected diodes.

8. The photometric circuit of claim 4 comprising a signal inverting circuit coupled to the output circuit of said operational amplifier in said feedback circuit.

9. The photometric circuit of claim 4 wherein said logarithmic compression means comprises a diode and further comprising a further diode, the photo-voltaic means, diode and further diode being coupled in series circuit relation, the source of reference potential being coupled to the other side of said further diode from said diode; and means providing a current signal to the junction between the diode and further diode corresponding to exposure time.

10. The photometric circuit of claim 9 comprising a source of potential, said means providing a current comprising an adjustable impedance coupled between the source of potential and the diode junction.

11. The photometric circuit of claim 10 wherein said operational amplifier has an input for receiving power coupled across said source of potential.

12. In a camera having a trailing screen, a. a photometric circuit comprising:

an operational amplifier having inversion and non-inversion signal input circuits and an output circuit, photo-voltaic means having first and second terminals coupled, respectively, between the inversion and non-inversion signal input circuits, means for maintaining the interterminal voltage of said photo-voltaic means at substantially 0 volts comprising a feedback circuit coupled between the output circuit of said operational amplifier and the first terminal of said photo-voltaic means, and logarithmic compression means serially coupled between the second end of the photo-voltaic means and a reference potential and responsive to the current provided by said photo-voltaic means for providing an output signal, and b. means responsive to said output signal for selectively actuating the trailing screen.

13. In the camera of claim 12 wherein said logarithmic compression means comprises a semi-conductor diode coupled between the photo-voltaic means and the reference potential for receiving the current from the photo-voltaic means.

14. In the camera of claim 12 wherein said photo-voltaic means comprises a semi-conductor photodiode.

15. In the camera of claim 13 wherein said photo-voltaic means comprises a semi-conductor photodiode, said semi-conductor photodiode and diode being serially connected together and polled to provide opposite PN junctions in the diodes serially passing through the serial connected diodes.

16. In the camera of claim 12 comprising a signal inverting circuit coupled to the output circuit of said operational amplifier in said feedback circuit.

17. In the camera of claim 12 wherein said logarithmic compression means comprises a diode and further comprising a further diode, the photo-voltaic means, diode and further diode being coupled in series circuit relation, the source of reference potential being coupled to the other side of said further diode from said diode; and means providing a current signal to the junction between the diode and further diode corresponding to exposure time, the output signal being obtained across the series connected diode and further diode.

18. In the camera of claim 17 comprising a source of potential, said means providing a current comprising an adjustable impedance coupled between the source of potential and the diode junction.

19. In the camera of claim 18 wherein said operational amplifier has an input for receiving power coupled across said source of potential.

20. A photometric circuit comprising:

photo-voltaic means having first and second terminals between which current is passed proportional to received light;

means for sensing the electrical signal across said first and second terminals and having an output circuit coupled to one of said terminals for maintaining a substantially 0 interterminal voltage across said terminals; and logarithmic compression means serially coupled between the other one of the terminals of the photovoltaic means and a reference potential and responsive to the current provided by the photovoltaic means for providing an output signal.

* * * * *

UNITED STATES PATENT AND TRADEMARK OFFICE

CERTIFICATE OF CORRECTION

PATENT NO. : 3,895,230

DATED : July 15, 1975

INVENTOR(S) : Takuo Itagaki

It is certified that error appears in the above-identified patent and that said Letters Patent are hereby corrected as shown below:

Column 3, line 43, "$T_V = B_V \quad S_V - A_V$" should read -- $T_V = B_V + S_V - A_V$ --.

Column 3, line 45, "is film VT is exposure time" should read -- is film sensitivity, T is exposure time --.

Column 4, line 30, "$I_L < I_P$" should read -- $I_L \ll I_P$ --.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*